(12) United States Patent
Srinivasan

(10) Patent No.: US 10,404,621 B2
(45) Date of Patent: Sep. 3, 2019

(54) SCALABLE INFINIBAND PACKET-ROUTING TECHNIQUE

(71) Applicant: Oracle International Corporation, Redwood City, CA (US)

(72) Inventor: Arvind Srinivasan, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 696 days.

(21) Appl. No.: 13/913,882

(22) Filed: Jun. 10, 2013

(65) Prior Publication Data

US 2014/0269720 A1   Sep. 18, 2014

Related U.S. Application Data

(60) Provisional application No. 61/799,307, filed on Mar. 15, 2013.

(51) Int. Cl.
*H04L 12/947* (2013.01)
*H04L 12/931* (2013.01)
*H04L 12/733* (2013.01)
*H04L 12/935* (2013.01)
*H04L 12/715* (2013.01)

(52) U.S. Cl.
CPC ............ *H04L 49/25* (2013.01); *H04L 45/122* (2013.01); *H04L 49/3009* (2013.01); *H04L 49/358* (2013.01); *H04L 45/46* (2013.01)

(58) Field of Classification Search
CPC ....... H04L 29/06; H04L 49/10; H04L 49/101; H04L 49/253; H04L 49/254; H04L 49/358; H04L 49/602; H04L 49/1515; H04L 49/3009; H04L 45/46; H04L 45/122; H04L 49/25
See application file for complete search history.

(56) References Cited

U.S. PATENT DOCUMENTS 7,853,643 B1 * 12/2010 Martinez ................. H04L 29/06
                                                    709/201
2005/0111465 A1 * 5/2005 Stewart ............... H04L 49/1515
                                                    370/400

(Continued)

OTHER PUBLICATIONS

InfiniBand Architecture Specification, 2007, vol. 1, pp. 1-1727.*

*Primary Examiner* — Michael Thier
*Assistant Examiner* — Prince A Mensah
(74) *Attorney, Agent, or Firm* — Park, Vaughan, Fleming & Dowler LLP

(57) ABSTRACT

An InfiniBand switch fabric is described. This InfiniBand switch fabric includes a hierarchy of switches having physical ports. These physical ports have associated local routing tables for nearest-neighbor connections to the physical ports. Moreover, relationships between the nearest-neighbor connections to each of the physical ports specified in the local routing tables are based in part on network-layer global identifiers that are assigned based on the hierarchy. Furthermore, local routing tables in the switches facilitate paths or routes for packets through the InfiniBand switch fabric without using a global routing table in the switches. In addition, the InfiniBand switch fabric includes a fabric manager, coupled to the switches, having the global routing table to assign the network-layer global identifiers.

12 Claims, 4 Drawing Sheets

(56) References Cited

U.S. PATENT DOCUMENTS

| | | | |
|---|---|---|---|
| 2005/0259647 A1* | 11/2005 | Wakumoto | H04L 45/00 370/389 |
| 2006/0002385 A1* | 1/2006 | Johnsen | H04L 49/358 370/389 |
| 2007/0008962 A1* | 1/2007 | Basu | H04L 45/00 370/389 |
| 2008/0144619 A1* | 6/2008 | Awsienko | H04L 45/04 370/389 |
| 2012/0087372 A1* | 4/2012 | Narasimhan | H04L 45/245 370/392 |
| 2012/0314706 A1* | 12/2012 | Liss | H04L 49/602 370/392 |
| 2013/0259033 A1* | 10/2013 | Hefty | H04L 49/25 370/355 |
| 2014/0153573 A1* | 6/2014 | Ramesh | H04L 45/748 370/392 |

\* cited by examiner

SCALABLE INFINIBAND PACKET-ROUTING TECHNIQUE

CROSS REFERENCE TO RELATED APPLICATION

This application claims priority under 35 U.S.C. § 119(e) to U.S. Provisional Application Ser. No. 61/799,307, entitled "Scalable InfiniBand Packet Routing Scheme Using Fabric of Switches," by Arvind Srinivasan, filed on Mar. 15, 2013, the contents of which are herein incorporated by reference.

BACKGROUND

Field

The disclosed embodiments generally relate to a packet-processing technique for communications networks. More specifically, the disclosed embodiments relate to the design of a packet-processing network that is based on an InfiniBand switch fabric with local routing tables that specify nearest-neighbor connections and facilitate paths for packets through the InfiniBand switch fabric.

Related Art

In high-performance systems, a network or input/output (I/O) switch fabric typically plays an important role in traffic movement among servers. For example, with servers running multiple virtual machines (VMs) and many virtualized applications, network-packet streams coming out of a server often include an aggregation of different services that are needed by each of the VMs and their applications. Moreover, when there are a large numbers of servers and VMs in an InfiniBand switch fabric, the servers are typically split into multiple subnet domains. In order to communicate among subnets, InfiniBand subnet routing is typically used.

While packet switching within a subnet is well defined, routing among subnets is not well defined. In particular, typically there are multiple ways for packet routing to occur among subnets. One approach is based on the destination identifier (ID) of the target VM. Typically, each VM is assigned a globally unique ID (GUID), which is either locally or globally administered. If the locality of the VM is known, the possible routes or paths can be selected a priori and used to schedule packet transfers so long as the routing tables in the InfiniBand switch fabric include sufficient information.

However, in an InfiniBand switch fabric with a complicated topological configuration in which there are many networked switches and host VMs, the total number of routes addressable by a given host can be extremely large. Consequently, the routing tables in the switches cannot be scaled as the number of addressable VMs grows, which makes it increasingly difficult to manage a large InfiniBand switch fabric. This problem is compounded in systems with VM migrations, which can make it even more difficult to determine routes through the InfiniBand switch fabric.

Hence, what is needed is an InfiniBand switch fabric that facilitates communication of packets without the problems described above.

SUMMARY

One embodiment of the present disclosure provides an InfiniBand switch fabric that includes switches, having physical ports, arranged in a hierarchy. A given physical port has an associated local routing table for nearest-neighbor connections to the given physical port. Moreover, relationships between the nearest-neighbor connections to the given physical port specified in the local routing table are based in part on network-layer global identifiers that are assigned based on the hierarchy. Furthermore, local routing tables in the switches facilitate paths for packets through the InfiniBand switch fabric without using a global routing table in the switches. In addition, the InfiniBand switch fabric includes a fabric manager, coupled to the switches, having the global routing table to assign the network-layer global identifiers.

Note that the local routing tables may represent connections between sources and destinations in a hierarchical manner in the InfiniBand switch fabric. Moreover, a given path between a given source and a given destination in the InfiniBand switch fabric may be unique. In some embodiments, the paths are pre-determined.

Furthermore, operation of the switches may be managed locally by the switches in the InfiniBand switch fabric.

In some embodiments, if a destination of a given packet is included in the local routing table, a given switch provides the given packet to a destination specified in the given packet. Otherwise, the given switch provides the given packet to another of the switches as specified in the local routing table. Note that the given packet is passed from switch to switch in the hierarchy until the given packet reaches the destination or until a hop count is exceeded, in which case the given packet may be dropped.

Another embodiment provides a system that includes the InfiniBand switch fabric.

Another embodiment provides a method for conveying a packet. During the method, network-layer global identifiers are assigned to switches in an InfiniBand switch fabric based on a hierarchy of switches in the InfiniBand switch fabric using a global routing table in a fabric manager. Then, the packet is received at a physical port of a switch in the InfiniBand switch fabric. Moreover, using an associated local routing table for nearest-neighbor connections to the physical port, whether a destination specified in the packet is included in the local routing table is determined, where the relationships between the nearest-neighbor connections to the physical port specified in the local routing table are based in part on the network-layer global identifiers that are assigned based on the hierarchy, and where the local routing tables in the switches facilitate paths for the packets through the InfiniBand switch fabric without using a global routing table in the switches. If the destination is included in the local routing table, the packet is provided to the destination. Alternatively, if the destination is not included in the local routing table, the packet is provided to another of the switches as specified in the local routing table.

Figure 2:
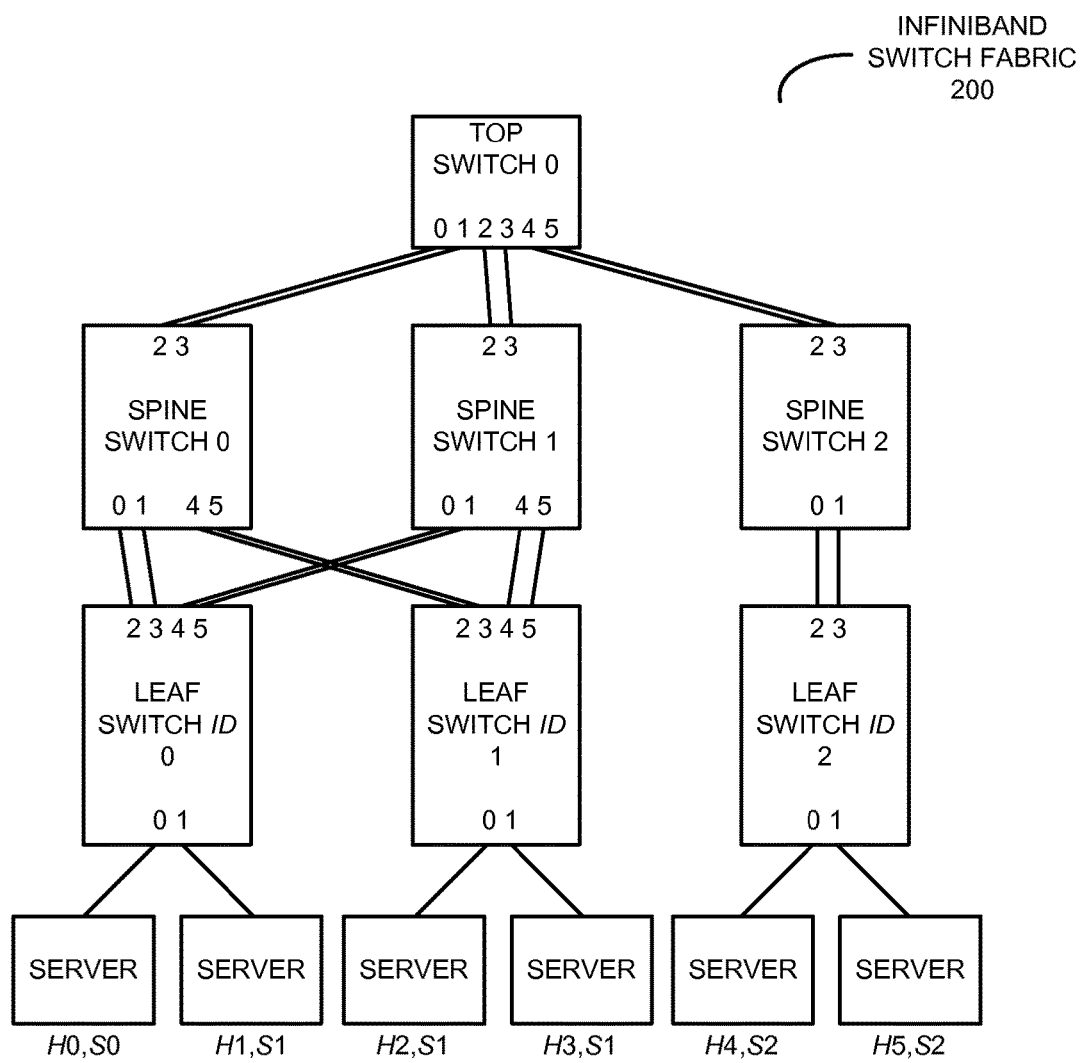
FIG. 2 is a block diagram illustrating an InfiniBand switch fabric in accordance with an embodiment of the present disclosure.

Table 1 is a routing table for top switch 0 in the InfiniBand switch fabric of FIG. 2 in accordance with an embodiment of the present disclosure.

Table 2 is a routing table for spine switch 0 in the InfiniBand switch fabric of FIG. 2 in accordance with an embodiment of the present disclosure.

Table 3 is a routing table for spine switch 1 in the InfiniBand switch fabric of FIG. 2 in accordance with an embodiment of the present disclosure.

Table 4 is a routing table for leaf-switch identifier (ID) 0 in the InfiniBand switch fabric of FIG. 2 in accordance with an embodiment of the present disclosure.

Table 5 is a routing table for leaf-switch ID 1 in the InfiniBand switch fabric of FIG. 2 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an InfiniBand switch fabric, a system that includes the InfiniBand switch fabric, and a method for providing a packet are described. This InfiniBand switch fabric includes a hierarchy of switches having physical ports. These physical ports have associated local routing tables for nearest-neighbor connections to the physical ports. Moreover, relationships between the nearest-neighbor connections to each of the physical ports specified in the local routing tables are based in part on network-layer global identifiers that are assigned based on the hierarchy. Furthermore, local routing tables in the switches facilitate paths or routes for packets through the InfiniBand switch fabric without using a global routing table in the switches. In addition, the InfiniBand switch fabric includes a fabric manager, coupled to the switches, having the global routing table to assign the network-layer global identifiers.

By facilitating paths for packets through the InfiniBand switch fabric without using global routing tables in the switches, the communication technique may allow routing between subnets to be unique and pre-determined. Moreover, the communication technique may allow the routing to be managed locally by the switches. For example, a given switch may provide a packet to a destination specified in a local routing table, or may provide the packet to another switch specified in the local routing table. This process may continue, passing the packet from switch to switch in the hierarchy, until the packet reaches the destination. This approach may allow routing in the InfiniBand switch fabric to be scaled and efficiently managed with complicated topological configurations that include multiple switches and virtual machines (VMs), and, thus, which include a large total number of addressable paths or routes.

Figure 1:
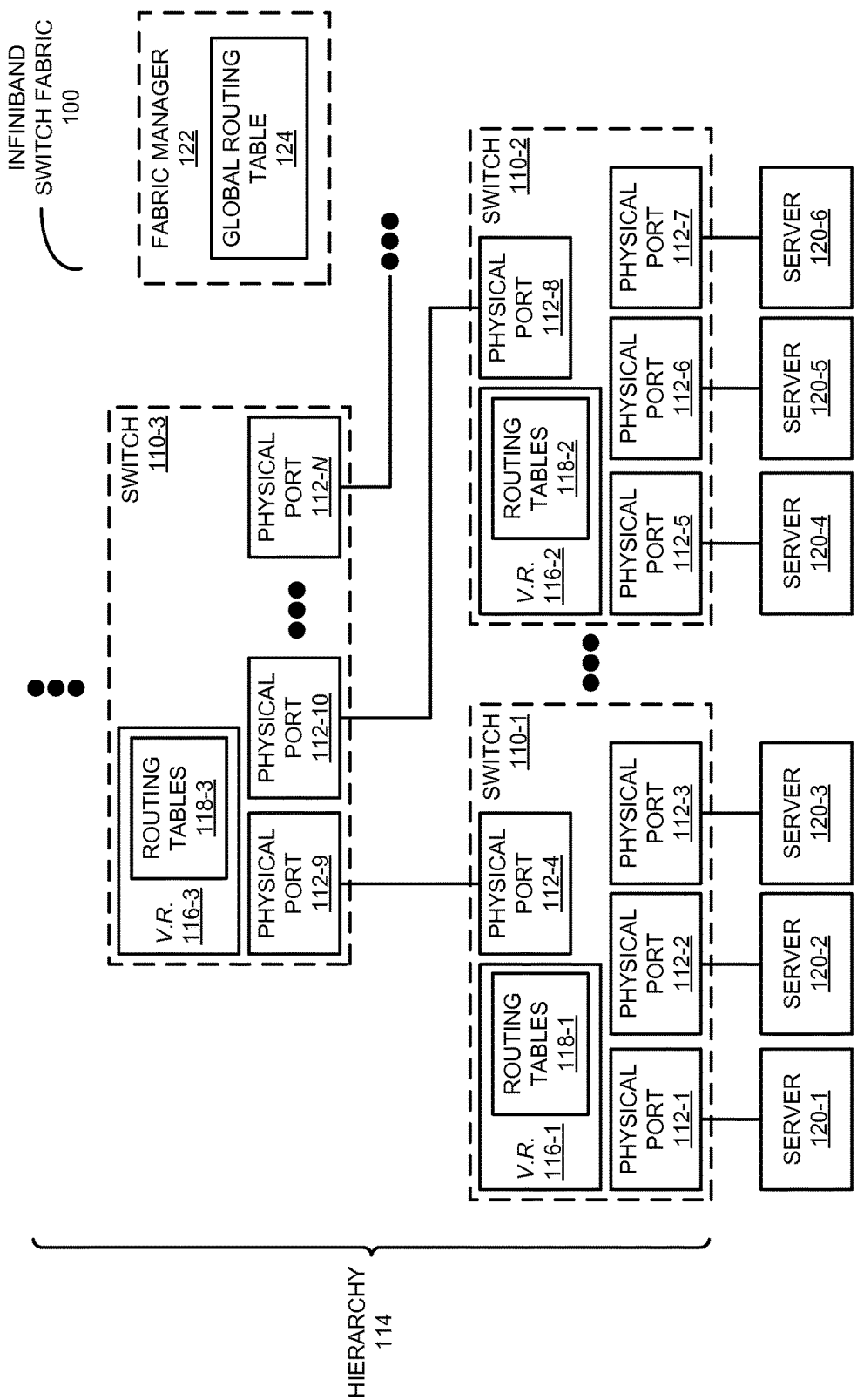
FIG. 1 is a block diagram illustrating an InfiniBand switch fabric in accordance with an embodiment of the present disclosure.

We now describe embodiments of the InfiniBand switch fabric and the system. FIG. 1 presents a block diagram illustrating InfiniBand switch fabric 100. This InfiniBand switch fabric includes switches 110, having physical ports 112, arranged in a hierarchy 114, which convey packets. A given physical port (such as physical port 112-1) has an associated local routing table (such as one of local routing tables 118-1) for nearest-neighbor connections to the given physical port, thereby specifying all of the output connections that the given physical port can be connected to. For example, one of routing tables 118-1 may specify that physical port 112-1 can be connected to physical ports 112-2, 112-3 and/or 112-4. Moreover, relationships between the nearest-neighbor connections to the given physical port specified in local routing tables 118 are based in part on network-layer global identifiers (in an Open Systems Interconnection or OSI model) that are assigned based on hierarchy 114. As described further below with reference to FIG. 2, local routing tables 118 in switches 110 facilitate paths for packets through InfiniBand switch fabric 100 without using a global routing table in switches 110.

Note that local routing tables 118 may represent connections between sources and destinations (such as servers 120) in a hierarchical manner in InfiniBand switch fabric 100. Moreover, a given path between a given source and a given destination in InfiniBand switch fabric 100 may be unique. In some embodiments, the paths are pre-determined. Thus, in some embodiments, there is no multi-path communication between a given source and a given destination in InfiniBand switch fabric 100 (i.e., there is only one path between the given source and the given destination).

Furthermore, operation of switches 110 may be managed locally by switches 110 in InfiniBand switch fabric 100. Thus, in some embodiment, InfiniBand switch fabric 100 does not include global management of switches 110. However, fabric manager 122 may use global routing table 124 to assign the network-layer global identifiers to switches 110. This allows the packets to be conveyed across subnets in InfiniBand switch fabric 100 and for switches 110 to locally manage communication of the given packet.

In some embodiments, if a destination of a given packet is included in the local routing table, a given switch provides the given packet to a destination specified in the given packet. Otherwise, the given switch provides the given packet to another of the switches as specified in the local routing table. Note that the given packet is passed from switch to switch in hierarchy 114 until the given packet reaches the destination or until a hop count is exceeded, in which case the given packet may be dropped.

We now describe exemplary embodiments of the InfiniBand switch fabric. In order to address a large number of paths and addressable hosts in a scalable manner, multiple routing tables may be combined across different switches 110 to obtain unified paths (for example, the multiplicative effect of the local routing tables in heiracrchy 114 may define unique paths through the InfiniBand switch fabric and, thus, effectively provides the information in global routing table 124, which provides a global view of InfiniBand switch fabric 100, without including global routing table 124 in switches 110). This results in multiple fan-outs, thereby resulting in a large set of addressable paths.

At least some of physical ports 112 may each include or may be associated with two or more virtual routers (V.R.s) 116. Note that a virtual router may represent a resource that can be enabled on any given physical port that facilitates multiple routing services. This capability may be facilitated by using a smart classification engine (e.g., a hierarchical classifier) that divides the traffic or network flows into different virtual ports. The resource in a given virtual router may represent a collection of routing tables and a programmable set of routing techniques. In turn, the routing techniques may represent a collection of header fields that may be used for route lookup and a set of actions or operations that result based on the lookup. Note that a given virtual router may provide a type of service for a given source-destination pair based on link-layer information and network-layer information, which is included in the packets (such as in headers), and different virtual routers can provide different types of service.

Using routing tables in the virtual routers, different service resources and levels may be associated with various virtual-port numbers. For example, by configuring Infiniband switch fabric 100, traffic flows corresponding to different service levels can bypass one another. Moreover, once it is determined that packets require routing (such as to a different subnet domain based on network-layer information in the packets, as opposed to within a given subnet domain based on link-layer information in the packets), differentiated service levels can be applied among various routing techniques.

Thus, the virtual routers may facilitate InfiniBand inter-subnet crossing. For example, if a routing service is required as packets traverse switches 110, the packet headers may be transformed accordingly (for example, when crossing from one subnet domain to another). In embodiments of the InfiniBand switch fabric in which identical devices are coupled or connected to build hierarchy 114 of switches 110, the header transformation performed by each virtual router is used to select the next virtual router to do subsequent transformations.

In order to achieve overall scaling, the locality of the VM may be embedded in the global identifier (ID) assigned to it. For example, the locality can be abstracted as a switch ID that is assigned to the connected VM. As packets traverse different hierarchies of switches, only a subset of the relevant routing fields from the destination ID may be looked up. In an exemplary embodiment, at the lowest level of hierarchy 114, the global unique ID (GUID) is compared by a given virtual router against its routing tables to determine the final port number and local ID (LID). At the middle level of hierarchy 114, virtual routers may only match the destination 'switch ID'.

The size of the routing table required at the lowest level of hierarchy 114 may equal the maximum number of VMs that can be physically connected to a particular switch. At the next level of hierarchy 114, the table size may equal the maximum number of leaf switches that can be connected. Typically, the switches at higher levels of hierarchy 114 may have fewer entries in their routing tables compared to the switches at lower levels. Because the number of tables within each hardware switch may be limited to a combination of the routing tables across the virtual routers, a multiplicative factor in scaling the total number of addressable paths or routes can be defined.

As an illustration of the fields in the headers in this approach, say that the global ID (GID) includes three fields: the subnet ID, the leaf-switch ID, and the unique ID. All told, there may be 128 bits. Of these, a path may be specified by matching 8 or 16 bits (thus, there may be 64 million paths). From the point of view of an InfiniBand header, the higher-order 64 bits (which may specify the subnet field) in the GID may include two sub-fields, the assigned subnet ID and the leaf-switch ID. The GUID may be preserved as the unique ID (64 bits), which can be either locally or globally administered in InfiniBand switch fabric 100.

Note that, in the routing table for a given switch, there may be two types of entries. A first type of entry may point to the VMs/servers that are physically connected or coupled to the given switch. In order to address each of these servers, the ternary content addressable memories (TCAMs) may need a perfect match on the header fields that are unique. In this case, this would be the subnet ID and the 64-bit unique ID. A match on these fields may return a destination port and the LID. However, this may only be applicable in case of a leaf switch (it may not be applicable for a spine switch or the next-level switch in hierarchy 114). The number of entries needed may equal the total addressable VMs/servers connected to the leaf switch. Moreover, the subnet ID may be part of the TCAM lookup if there is more than one subnet within a leaf switch.

The second type of entry may point to the next hop for servers that are across a spine switch or another switching hierarchy. In case of a leaf switch, this type of entry may point to the paths that can be taken to reach the next level. This may refer to an entry that is not part of the current leaf switch (i.e., a match on a leaf-switch ID that is not part of the current leaf switch). Alternatively, in case of a spine switch, this type of entry may be based on the leaf-switch ID that is connected to each of the physical ports of the switch. In this case, the TCAM fields may be matched on the leaf-switch-ID field and potentially the subnet-ID field. The lower 64 bits may be masked out and may be ignored when determining the path or route.

Moreover, at the next level of hierarchy 114, the relevant field to match on may only be the subnet ID. Furthermore, note that multiple egress paths may be possible for any given entry.

The sum of the entries described above may determine the total size of the routing table needed. In general, the total number of routes possible may depend on hierarchy 114 and the multiplicative factor in use during fan-out from one routing table to another. However, the possible paths or routes may not depend on the size of a particular routing table.

An illustration of the programming of the routing tables in switches 110 for a simple topology is shown in FIG. 2, which presents a block diagram illustrating InfiniBand switch fabric 200. In this example, there are three leaf switches (leaf switch ID 0-2), each of which has two hosts (such as servers) connected, and which are identified by a host ID and a subnet ID. Note that leaf switch 0 has two hosts in different subnets, while each of leaf switches 1 and 2 has two hosts connected on the same subnet. Moreover, top switch 0 is a third-level switch that connects to a different rack.

The routing tables for several of the switches in FIG. 2 are shown in Tables 1-5. In these routing tables, a '-' indicates 'do not care.' A given routing table does not need to know or include the entire space of addresses. Instead, it only needs to know whether a given packet is inside or outside of the associated switch (i.e., is the given packet mine and, if not, where do I pass the given packet to.) Note that the TCAMs may be programmed in the order of precedence shown in Table 1-5. Also note that Tables 1-5 are an illustration of the logic in the routing tables. However, in practice, a wide variety of implementations may be used with more or less detail about the connections to the physical ports.

TABLE 1 presents a routing table for top switch 0 in InfiniBand switch fabric 200.

| Subnet ID | Leaf-Switch ID | GUID | Destination Port |
|---|---|---|---|
| S0 | — | — | {0, 1, 2, 3} |
| S1 | — | — | {0, 1, 2, 3} |
| S2 | — | — | {4, 5} |

TABLE 2 presents a routing table for spine
switch 0 in InfiniBand switch fabric 200.

| Subnet ID | Leaf-Switch ID | GUID | Destination Port |
|---|---|---|---|
| — | 0 | — | {0, 1} |
| — | 1 | — | {4, 5} |
| — | — | — | {2, 3} |

TABLE 3 presents a routing table for spine
switch 1 in InfiniBand switch fabric 200.

| Subnet ID | Leaf-Switch ID | GUID | Destination Port |
|---|---|---|---|
| — | 0 | — | {0, 1} |
| — | 1 | — | {4, 5} |
| — | — | — | {2, 3} |

TABLE 4 presents a routing table for leaf-switch
identifier (ID) 0 in InfiniBand switch fabric 200.

| Subnet ID | Leaf-Switch ID | GUID | Destination Port |
|---|---|---|---|
| S0 | — | H0 | 0 |
| S1 | ! = myID | — | {2, 3, 4, 5} |
| S1 | ! = myID | H1 | 1 |
| — | — | — | {2, 3, 4, 5} |

TABLE 5 presents a routing table for leaf-
switch ID 1 in InfiniBand switch fabric 200.

| Subnet ID | Leaf-Switch ID | GUID | Destination Port |
|---|---|---|---|
| — | — | H2 | 0 |
| — | — | H3 | 1 |
| — | ! = myID | — | {2, 3, 4, 5} |

Figure 3:
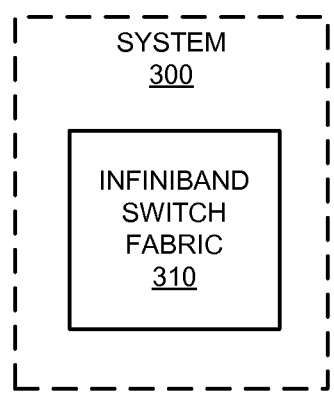
FIG. 3 is a block diagram illustrating a system that includes the InfiniBand switch fabric of FIG. 1 in accordance with an embodiment of the present disclosure.

InfiniBand switch fabric 100 (FIG. 1) may be included in a variety of systems, such as system 300 shown in FIG. 3, which includes InfiniBand switch fabric 310). In general, functions of the InfiniBand switch fabric, the optional hierarchical classifier and the system may be implemented in hardware and/or in software. Thus, the InfiniBand switch fabric and/or the system may include one or more program modules or sets of instructions stored in an optional memory subsystem (such as DRAM or another type of volatile or non-volatile computer-readable memory), which may be executed by an optional processing subsystem. Note that the one or more computer programs may constitute a computer-program mechanism. Furthermore, instructions in the various modules in the optional memory subsystem may be implemented in: a high-level procedural language, an object-oriented programming language, and/or in an assembly or machine language. The programming language may be compiled or interpreted, e.g., configurable or configured, to be executed by the processing subsystem.

Components in the InfiniBand switch fabric and/or the system may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, the system may be at one location or may be distributed over multiple, geographically dispersed locations.

In the communication technique, packets may be received via a network, such as: the Internet, World Wide Web (WWW), an intranet, a cellular-telephone network, LAN, WAN, MAN, Ethernet, InfiniBand, or a combination of networks, or other technology enabling communication between computing systems.

Note that the system may include: a VLSI circuit, a switch, a hub, a bridge, a router, a communication system (such as a WDM communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Moreover, a given computer system may be at one location or may be distributed over multiple, geographically dispersed locations.

Furthermore, the embodiments of the InfiniBand switch fabric and/or the system may include fewer components or additional components. For example, the InfiniBand switch fabric is a controlled switch fabric, so that, if switches are added or removed, the routing tables in the switches may be reprogrammed. Although these embodiments are illustrated as having a number of discrete items, the InfiniBand switch fabric and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the InfiniBand switch fabric and/or the system may be implemented more in hardware and less in software, or less in hardware and more in software, as is known in the art.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Figure 4:
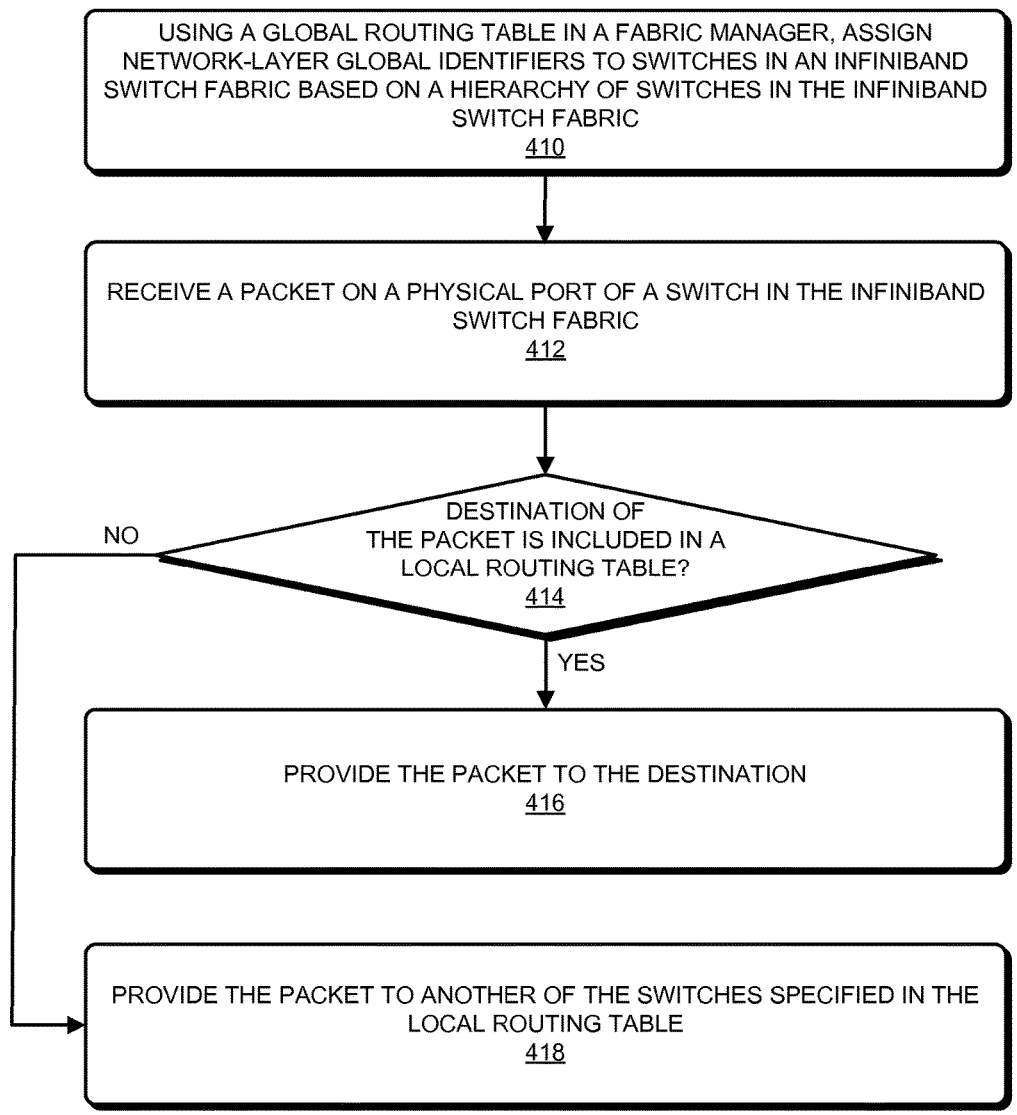
FIG. 4 is a flow chart illustrating a method for providing a packet in accordance with an embodiment of the present disclosure.

We now describe the method. FIG. 4 presents a flow chart illustrating a method 400 for providing a packet, which may be performed by an InfiniBand switch fabric (such as InfiniBand switch fabric 100 in FIG. 1). During this method, network-layer global identifiers are assigned to switches in an InfiniBand switch fabric based on a hierarchy of switches in the InfiniBand switch fabric using a global routing table in a fabric manager (operation 410). Then, the packet is received at a physical port of a switch in the InfiniBand switch fabric (operation 412). Moreover, an associated local routing table for nearest-neighbor connections to the physical port determines whether a destination specified in the packet is included in the local routing table (operation 414), where the relationships between the nearest-neighbor connections to the physical port specified in the local routing table are based in part on the network-layer global identifiers that are assigned based on the hierarchy, and where the local routing tables in the switches facilitate paths for the packets through the InfiniBand switch fabric without using the global routing table in the switches. If the destination is included in the local routing table (operation 414), the switch provides the packet to the destination (operation 416). Alternatively, if the destination is not included in the local routing table (operation 414), the switch provides the packet to another of the switches as specified in the local routing table (operation 418).

In some embodiments of method 400, there are additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An InfiniBand switch fabric, comprising:
   switches, having a plurality of physical ports, arranged in a hierarchy, wherein a given physical port in the plurality of physical ports has an associated local routing table for nearest-neighbor connections to the given physical port;
   wherein relationships between the nearest-neighbor connections to the given physical port specified in the local routing table are based in part on network-layer global identifiers that are assigned based on the hierarchy; and
   wherein local routing tables in the switches facilitate paths for packets through the InfiniBand switch fabric without using a global routing table in the switches, wherein a given path between a given source and a given destination in the InfiniBand switch fabric is unique, wherein the paths are pre-determined; and
   a fabric manager, coupled to the switches, having the global routing table to assign the network-layer global identifiers, wherein the network-layer global identifiers comprise a subnet ID, a leaf-switch ID, and a global unique ID;
   wherein, if a destination of a given packet is included in the local routing table, a given switch provides the given packet to a destination specified in the given packet; and
   wherein, if the destination is not included in the local routing table, the given switch provides the given packet to another of the switches as specified in the local routing table.

2. The InfiniBand switch fabric of claim 1, wherein the local routing tables represent connections between sources and destinations in a hierarchical manner in the InfiniBand switch fabric.

3. The InfiniBand switch fabric of claim 1, wherein operation of the switches is managed locally by the switches in the InfiniBand switch fabric.

4. The InfiniBand switch fabric of claim 1, wherein the given packet is passed from switch to switch in the hierarchy until the given packet reaches the destination.

5. A system, comprising an InfiniBand switch fabric, wherein the InfiniBand switch fabric includes:
   switches, having a plurality of physical ports, arranged in a hierarchy, wherein a given physical port in the plurality of physical ports has an associated local routing table for nearest-neighbor connections to the given physical port;
   wherein relationships between the nearest-neighbor connections to the given physical port specified in the local routing table are based in part on network-layer global identifiers that are assigned based on the hierarchy; and
   wherein local routing tables in the switches facilitate paths for packets through the InfiniBand switch fabric without using a global routing table in the switches, wherein a given path between a given source and a given destination in the InfiniBand switch fabric is unique, wherein the paths are pre-determined; and
   a fabric manager, coupled to the switches, having the global routing table to assign the network-layer global identifiers, wherein the network-layer global identifiers comprise a subnet ID, a leaf-switch ID, and a global unique ID;
   wherein, if a destination of a given packet is included in the local routing table, a given switch provides the given packet to a destination specified in the given packet; and wherein, if the destination is not included in the local routing table, the given switch provides the given packet to another of the switches as specified in the local routing table.

6. The system of claim 5, wherein the local routing tables represent connections between sources and destinations in a hierarchical manner in the InfiniBand switch fabric.

7. The system of claim 5, wherein operation of the switches is managed locally by the switches in the InfiniBand switch fabric.

8. The system of claim 5, wherein the given packet is passed from switch to switch in the hierarchy until the given packet reaches the destination.

9. A method for conveying a packet, wherein the method comprises:
   using a global routing table in a fabric manager, assigning network-layer global identifiers to switches in an InfiniBand switch fabric based on a hierarchy of switches in the InfiniBand switch fabric, wherein the network-layer global identifiers comprise a subnet ID, a leaf-switch ID, and a global unique ID;
   receiving the packet at a physical port of a switch in the InfiniBand switch fabric, wherein the switch comprises a plurality of physical ports, wherein the plurality of physical ports correspond to a plurality of local routing tables respectively;
   using an associated local routing table for nearest-neighbor connections to the physical port, determining if a destination specified in the packet is included in the local routing table, wherein relationships between the nearest-neighbor connections to the physical port specified in the local routing table are based in part on the network-layer global identifiers that are assigned based on the hierarchy, and wherein local routing tables in the switches facilitate paths for packets through the InfiniBand switch fabric without using the global routing table in the switches, wherein a given path between a given source and a given destination in the InfiniBand switch fabric is unique, wherein the paths are predetermined;
   if the destination is included in the local routing table, providing the packet to the destination; and
   if the destination is not included in the local routing table, providing the packet to another of the switches as specified in the local routing table.

10. The method of claim 9, wherein the local routing tables represent connections between sources and destinations in a hierarchical manner in the InfiniBand switch fabric.

11. The method of claim 9, wherein operation of the switches is managed locally by the switches in the InfiniBand switch fabric.

12. The method of claim 9, wherein the packet is passed from switch to switch in the hierarchy until the packet reaches the destination.

* * * * *

UNITED STATES PATENT AND TRADEMARK OFFICE
CERTIFICATE OF CORRECTION

PATENT NO. : 10,404,621 B2
APPLICATION NO. : 13/913882
DATED : September 3, 2019
INVENTOR(S) : Srinivasan Page 1 of 1

It is certified that error appears in the above-identified patent and that said Letters Patent is hereby corrected as shown below:

In the Specification

In Column 4, Line 39, delete "heiracrchy" and insert -- hierarchy --, therefor.

Signed and Sealed this
Twenty-fifth Day of August, 2020

Andrei Iancu
*Director of the United States Patent and Trademark Office*